United States Patent [19]

Emura et al.

[11] Patent Number: 5,400,391
[45] Date of Patent: Mar. 21, 1995

[54] MOBILE COMMUNICATION SYSTEM

[75] Inventors: Katsumi Emura; Makoto Shibutani; Junji Namiki; Toshihito Kanai, all of Tokyo, Japan

[73] Assignee: NEC Corporation, Tokyo, Japan

[21] Appl. No.: 289,545

[22] Filed: Aug. 11, 1994

Related U.S. Application Data

[63] Continuation of Ser. No. 761,077, Sep. 17, 1991, abandoned.

[30] Foreign Application Priority Data

Sep. 17, 1990 [JP] Japan .................................. 2-246593
Sep. 18, 1990 [JP] Japan .................................. 2-248125

[51] Int. Cl.⁶ ........................................ H04M 11/00
[52] U.S. Cl. ........................................ 379/59; 379/58; 379/56; 455/33.1
[58] Field of Search ................ 379/58, 59, 60, 56; 455/33.1, 33.2, 67.1, 69; 359/152, 172, 173

[56] References Cited

U.S. PATENT DOCUMENTS 4,568,800 2/1986 Orikasa .............................. 379/63
5,103,459 4/1992 Gilhousen et al. ............ 455/33.1 X

FOREIGN PATENT DOCUMENTS 0368673  5/1990 European Pat. Off. .
0391597 10/1990 European Pat. Off. .
63-169835 7/1988 Japan .
1314443 12/1989 Japan .

OTHER PUBLICATIONS

39th IEEE Vehicular Technology Conference, vol. 1, May 1, 1989, San Francisco, pp. 398-400, L. J. Meyer, "Using Fiber Optics with Analog R.F. Signals".

*Primary Examiner*—Curtis Kuntz
*Assistant Examiner*—G. J. Oehling
*Attorney, Agent, or Firm*—Sughrue, Mion, Zinn, Macpeak & Seas

[57] ABSTRACT

A cellular mobile communication system in which each of one or more cells is provided with a base radio station, and mobile terminals communicate with the base radio stations. Base radio stations (21, 22 and 23) are connected to a central base station (100) by optical fibers. The central base station is connected to a mobile switching center (50). Each of the base radio stations is provided with an O/E converter (201) and E/O converter (207). The O/E converter converts a optical signal containing speech signals and a call connection control signal into RF signals. The E/O converter (207) converts RF signals, received from a mobile terminal (11) via an antenna (204), into optical signals and transmits the optical signals to the central base station. The central base station comprises O/E converters (301-303) for converting optical signals from each base radio station into RF signals; receivers (401-403) for demodulating these RF signals; transmitters (406-408) for converting speech signals and a call connection control signal from the mobile switching center into RF signals; and E/O converters (304-306) for converting these RF signals into optical signals and transmitting the optical signals to a base radio station.

1 Claim, 4 Drawing Sheets

MOBILE COMMUNICATION SYSTEM

This is a Continuation of application No. 07/761,077, filed Sep. 17, 1991, now abandoned.

BACKGROUND OF THE INVENTION

The present invention relates to a mobile communication system using a cellular system.

In a mobile communication system, such as a mobile telephone system, the service area is divided into a plurality of small zones or cells, in each of which a base radio station is arranged. This arrangement is known as a cellular system. A cellular system effectively utilizes frequency resources by making it possible to use the same frequency band repeatedly between cells where no interference occurs.

A base radio station in a mobile telephone system primarily consists of an antenna, a duplexer, a transceiver for conversation and control purposes and a base station controller as described in FIG. 11.14, FIG. 11.16 and FIG. 11.17 *Mobile Telephone* (in Japanese) published by the Institute of Electronics, Information and Communication Engineers (edited under supervision by Moriji Kuwabara).

In a cellular system, the smaller the cell size, the more times the same frequency band can be used in repetition. Therefore, the cell size has to be reduced along with an increase of subscribers, and a microcellular system of about 200 m in cell radius is predicted to become required in the near future. In a microcellular system, it would be desirable to install base radio stations on existing street lamp poles and utility poles. However, since each base station of any existing type involves even a transceiver and a base station controller, it is too large to be mounted on a street lamp or utility pole.

Moreover, since the mobile terminals move around and perform communication in a mobile communication system, the traffic not only is geographically uneven but also varies from time to time. For instance, while the peak of traffic usually occurs in a downtown center in the daytime, it is dispersed into the suburbs at night. Furthermore if a traffic jam arises, the traffic around it might become significantly dense.

In order to provide adequate service quality, i.e. to ensure a low enough call blocking probability, against such a variable peak of traffic, the base station in each cell should be equipped with a sufficient number of speech transceivers to accommodate the heaviest predictable traffic in the cell. In such an arrangement, however, the utilization rate of each radio transceiver would approach 100% only in the peak period, but would be extremely low in other periods, resulting in a poor cost performance.

SUMMARY OF THE INVENTION

An object of the present invention, therefore is to reduce the dimensions of the base radio station by utilizing the low-noise, low-distortion and wide-band characteristics of light beam type transmission, and using optical transmission techniques for the concentrative handling of radio signals transmitted from and to be received by many dispersed base stations.

Another object of the invention is to provide an economical mobile communication system capable of flexibly accommodating geographically uneven traffic which also varies from time to time.

According to the invention, there can be provided a mobile communication system using a cellular system having at least one cell, in which radio transceivers for performing communication with mobile terminals are not arranged in each of said cells but are concentrated in one or more central base stations as a plurality or pluralities of common radio transceivers, and said central base station or stations and said radio transceivers are optically coupled with each other.

DETAILED DESCRIPTION OF THE PREFERRED EMBODIMENTS

Figure 1:
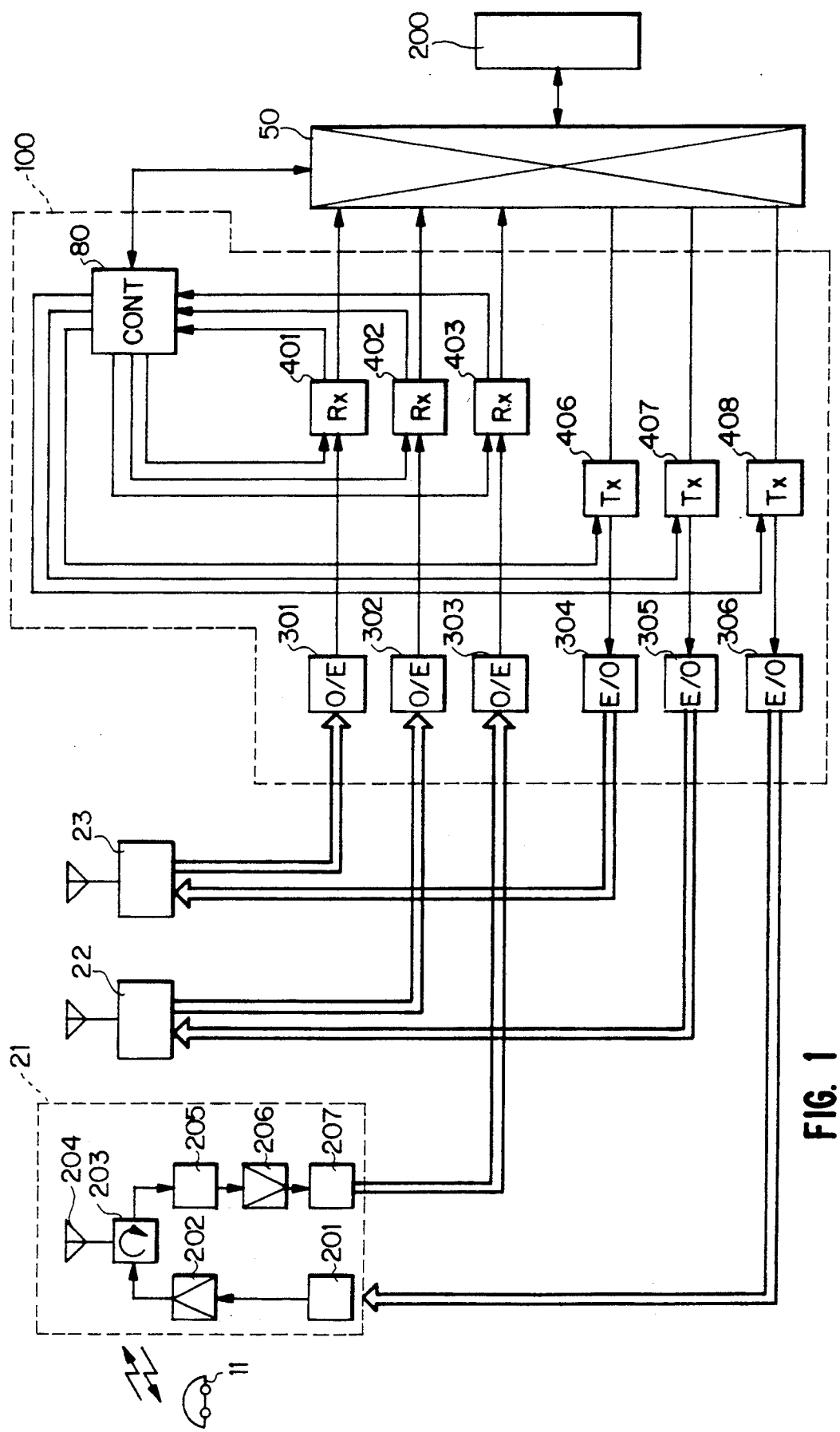
FIG. 1 is a block diagram illustrating a first preferred embodiment of the present invention.

Now will be described a first preferred embodiment of the present invention with reference to FIG. 1, which illustrates an arrangement of three cells belonging to a central base station. This first embodiment comprises base radio stations 21, 22 and 23 one of which is provided in each cell and transmits and receives signals to and from mobile stations at a radio frequency, and a central base station 100 connected to the base radio stations by optical fibers.

The base radio station 21 consists of an optical-to-electric (O/E) converter 201 for converting optical transmit signals supplied via optical fibers from the central base station 100 into transmit signals of the RF band; an amplifier 202 for amplifying the O/E converter 201 to a prescribed level; a duplexer 203 for supplying the output of the amplifier 202 to an antenna 204 and supplying signals received by the antenna 204 to a bandpass filter 205; the band-pass filter 205; a receive amplifier 206; and an electric-to-optical (E/O) converter 207 for converting receive RF signals, which are the output of the receive amplifier 206, into optical signals and supplying the optical signals to the central base station 100 via optical fibers.

The central base station 100 involves O/E converters 301, 302 and 303 for converting optical receive signals supplied from the base radio stations 21, 22 and 23, respectively, into electric signals; and receivers 401, 402 and 403 for demodulating RF signals supplied from the O/E converters 301, 302 and 303, respectively, into baseband signals.

The central base station further involves transmitters 406, 407 and 408 for appropriately modulating transmit baseband signals supplied from a mobile switching center 50 and converting them into signals of the RF band; and E/O converters 304, 305 and 306 for converting transmit RF signals from the transmitters 406, 407 and 408 respectively, and sending each of the optical signals to the corresponding base radio station via optical fibers.

The mobile switching center 50 sends out baseband signals, supplied from the receivers 401, 402 and 403, to a public telephone network 200, and also sends out baseband transmit signals, supplied from the public telephone network 200, to a transmitter designated by a control circuit 80, i.e. the transmitter corresponding to the cell in which is present the mobile terminal 11 which is the other party to communicate with.

In FIG. 1, as the mobile terminal 11 and the mobile switching center 50 are similar to those generally used and their configurations are extensively known to persons skilled in the art, they are not described in detail herein.

At the base radio station 21, RF signals received by the antenna 204 are supplied via the duplexer 203, the receive filter 205 and the receive amplifier 206 to the E/O converter 207, which consists of a laser diode and its driver circuit, and converted by the converter 207 into an optical signals, which are transmitted to the central base station 100 via optical fibers. At the central base station 100, the receive RF signals are first reproduced by the O/E converters 301 to 303, and demodulated by the receivers 401 to 403 into inbound speech signals, which are sent out to the mobile switching center 50.

Incidentally, it is the same as in the prior art that the receive frequencies of the receivers 401, 402 and 403 are set by a control signal from the control circuit 80, and that call control information received via a base radio station is sent out to the control circuit 80 to have the control circuit 80 control the mobile switching center 50. In a cellular system, the cell in which the mobile terminal is located is detected on the basis of the receive field intensity at the antenna of the base radio station, and a handover is effected at the mobile switching center every time the mobile terminal moves from one cell to next. The receive field intensity information needed to make the control circuit 80 generate the control signal for this purpose is also sent from the receiver to the control circuit 80. In these respects, too, the arrangement is the same as in the prior art.

Outbound speech signals from the mobile switching center 50 are converted into optical signals by the E/O converters 304 to 306 after being converted into transmit RF signals by transmitters 406 to 408 in the central base station 100. The optical signals sent out by the central base station are entered into the O/E converter 201, consisting of a photodiode and a front end circuit, in the base radio station 21, and transmitted from the antenna 204 via the transmit amplifier 202 and the duplexer 203. The other base radio stations 22 and 23 have the same configuration.

According to the present invention, RF signals received by the antenna of a base radio station are converted into optical signals, which are then transmitted to the mobile switching center via low-loss optical fibers.

Because of this feature, as illustrated in FIG. 1, each base radio station, which needs only the O/E converter 201, transmit amplifier 202, duplexer 203, antenna 204, band-pass filter 205, receive amplifier 206 and E/O converter 207, is significantly reduced in dimensions, and can be readily mounted on a utility pole.

Whereas the foregoing detailed description referred to the first preferred embodiment of the present invention, it will not be always easy for this first embodiment to secure the required level of the carrier-to-noise (C/N) ratio for optical transmission if the level of RF signals received by a base radio station is not high enough. In view of this problem, a second preferred embodiment of the invention secures an adequate C/N ratio by providing an automatic gain control (AGC) circuit immediately before the E/O converter 207 and amplifying therewith the radio signals received by the antenna 204 to a prescribed output level.

Figure 2:
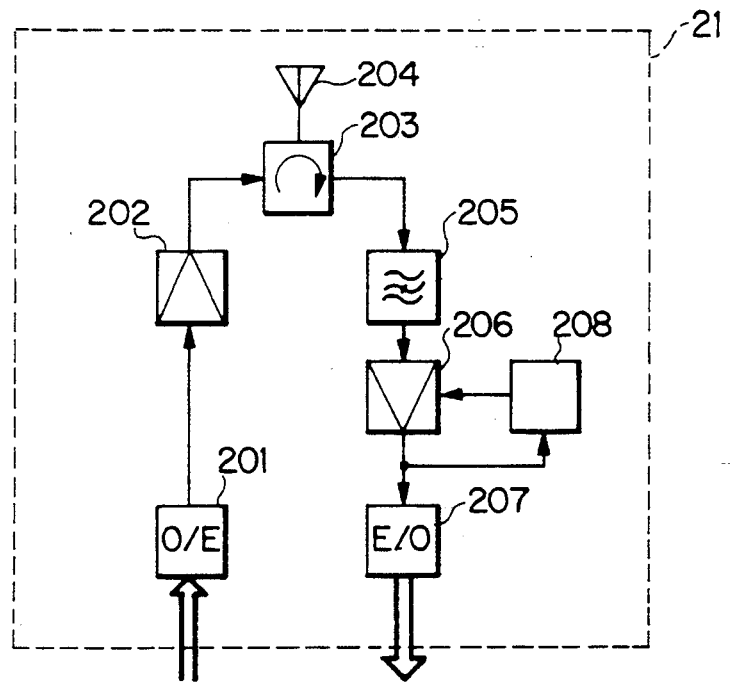
FIGS. 2 and 3 are block diagrams illustrating the configurations of base radio stations to be used in second and third preferred embodiments, respectively, of the invention.

FIG. 2 is a block diagram illustrating the configuration of a base radio station to be used in the second preferred embodiment of the invention. Since the configuration of the central base station in this second embodiment is the same as in FIG. 1, only the base radio station will be described below.

Suppose, for instance, that no more than five carriers are used in each cell. When multiplexing five carriers and modulating a semiconductor laser for optical transmission, if the total modulation index surpasses 100%, a large distortion due to overmodulation will occur to make it impossible to achieve adequate transmission quality. Therefore the modulation index per channel is usually kept not to exceed 20%. Meanwhile the C/N ratio realized in optical transmission is about 80 dB at the maximum when the modulation index is 20%. If the modulation index drops here, the C/N ratio that is achieved will drop correspondingly. In a mobile communication system, there is a difference of 60 dB or more in the level of signals received by the antenna of a base radio station. Therefore, a carrier of the lowest signal level may fail to satisfy the C/N ratio requirement of 15 dB.

In the usual state in which a mobile communication system is used, a traffic peak does not occur so frequently, and it is rare for every carrier to have a high reception level at the same time. Therefore, where the reception level of a part of carriers is low, the total modulation index of the semiconductor laser often is far lower than 100%. Therefore, if the amplitude of the high frequency signal component with which the semiconductor laser is modulated is detected and that amplitude is so controlled as to cause the semiconductor laser to be always modulated at a modulation index of approximately 100%, even a carrier component of a low reception level will be modulated at a substantially high modulation index, making it possible to achieve a high enough C/N ratio.

In the base radio station of the second preferred embodiment of the invention illustrated in FIG. 2, the receiver amplifier 206 consists of a variable-gain amplifier, and its output level is detected by an AGC circuit 208, with whose output signal the gain of the receiver amplifier 206 is controlled to keep constant the level of high frequency signals entered into the laser diode of the E/O converter 207, its modulation index found to be always 95%. When this mobile communication system was actually operated, while the lowest C/N ratio of receive signals at the central base station 100 was 15 dB without controlling the gain of the receive amplifier 206, the average modulation index for each carrier was increased by the AGC circuit 208, the lowest C/N ratio being improved to 25 dB.

The second preferred embodiment of the present invention thus has the advantage of making it possible to prevent the C/N ratio from being adversely affected by a drop in receive field intensity at the base radio station.

This second embodiment, however, involves a new problem, which is described below. Generally in a cellular mobile communication system, the level of receive signals indicating the receive field intensity at the antenna is detected at a base station to locate the cell in which is present the mobile terminal with which communication is desired, and control is so effected as to send out speech signals from a public line to the base radio station in the cell where the mobile terminal is present. However, if an AGC circuit is used to achieve control in such a manner that the degree of modulation at the E/O converter remain constant irrespective of the condition of reception as in the second embodiment here, the receive field intensity for each channel detected at the central base station cannot accurately reflect the condition of reception at the antenna. A third preferred embodiment of the invention is intended to solve this problem newly occurring with the second embodiment.

Figure 3:
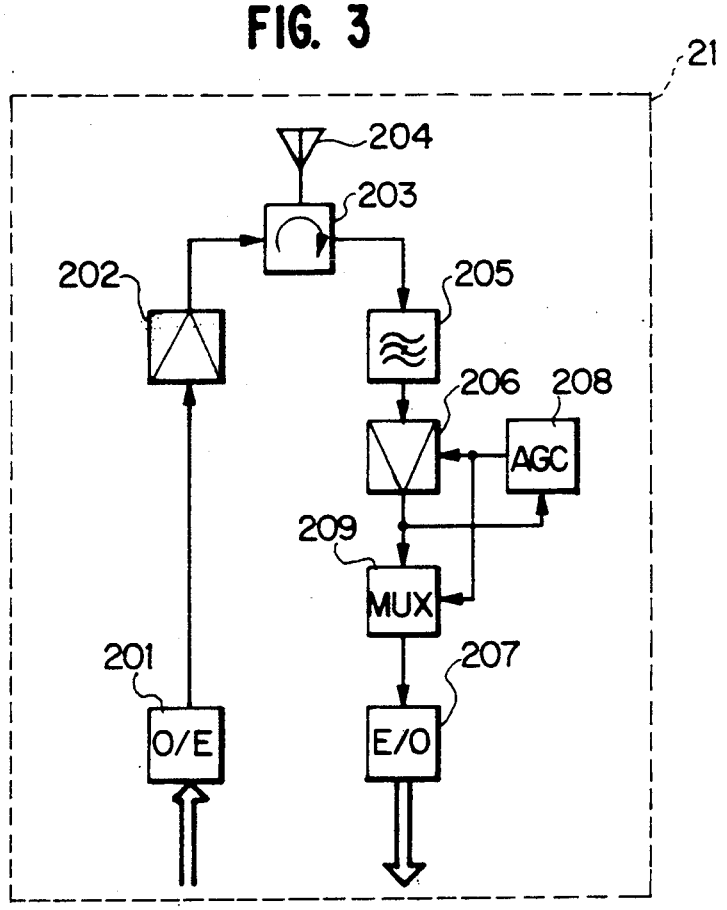

FIG. 3 is a block diagram illustrating the configuration of a base radio station to be used in a second embodiment of the invention. This embodiment differs from what is shown in FIG. 2 in that it has a multiplexer 209 for multiplexing the output signals of the AGC circuit 208 with receive RF signals. This multiplexing of receive RF signals with the output signals of the AGC circuit 208 may use either time division or frequency division. Detailed description of the configuration and operation of the time division multiplexer or the frequency division multiplexer to be used, which are well known to persons skilled in the art, are dispensed with herein. This embodiment newly requires a circuit for separating the receive RF signals and the output signals of the AGC circuit 208 from the multiplexed signals. It is evident that such a circuit can be provided between the O/E converts 301, 302 and 303 and the receivers 401, 402 and 403 in FIG. 1 and signals representing the separated AGC circuit output be supplied to the control circuit 80.

What is important here is that, in this third preferred embodiment, the receive field intensity at the antenna can be accurately estimated by compensating the level of receive RF signals supplied to the central base station 100 with the output signals of the AGC circuit 208. Thus in this third embodiment, as in the prior art, the central base station can accurately locate the cell in which is present the mobile station with which communication is desired.

Figure 4:
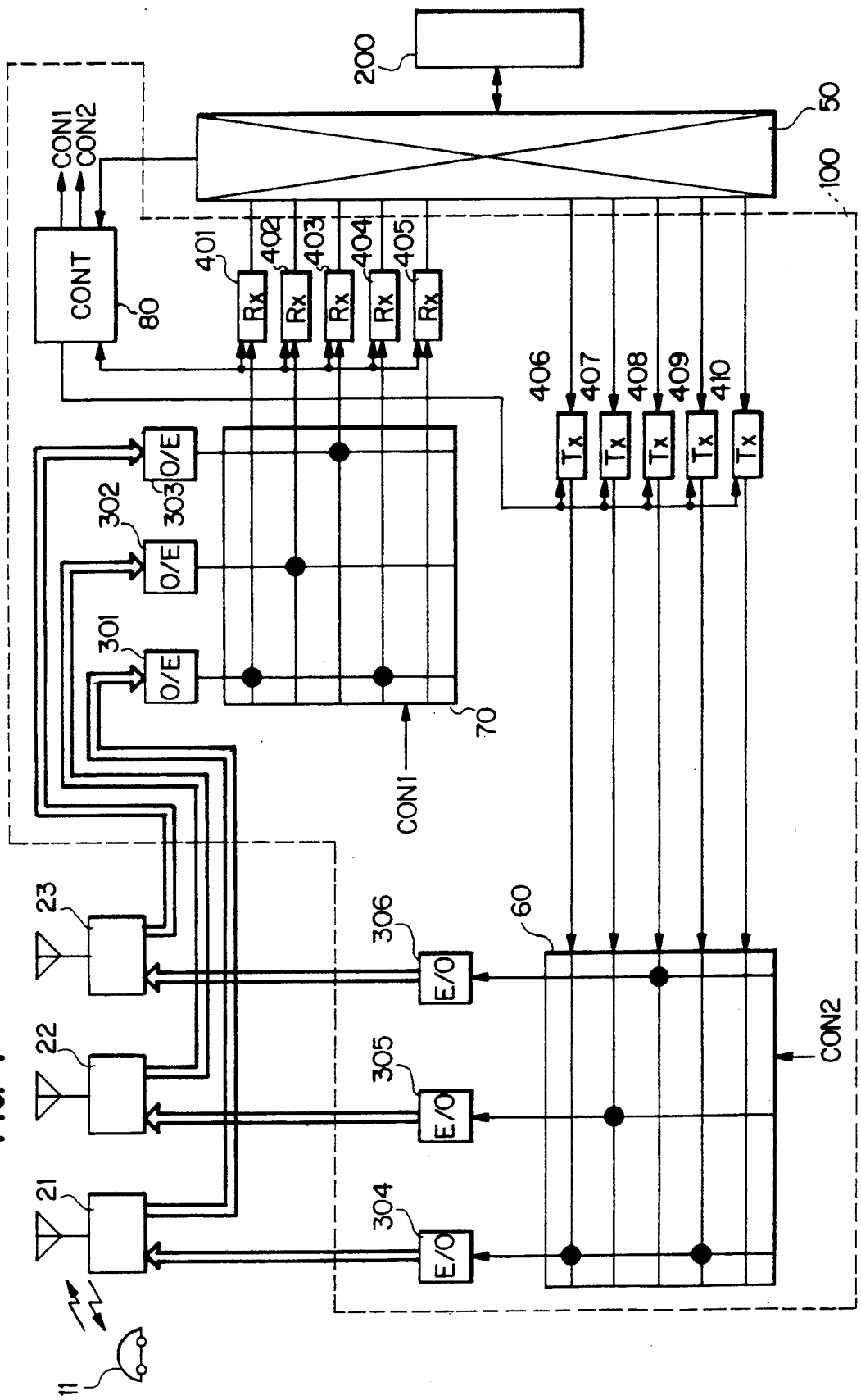
FIGS. 4 and 5 illustrate a fourth preferred embodiment of the invention.
Figure 5:
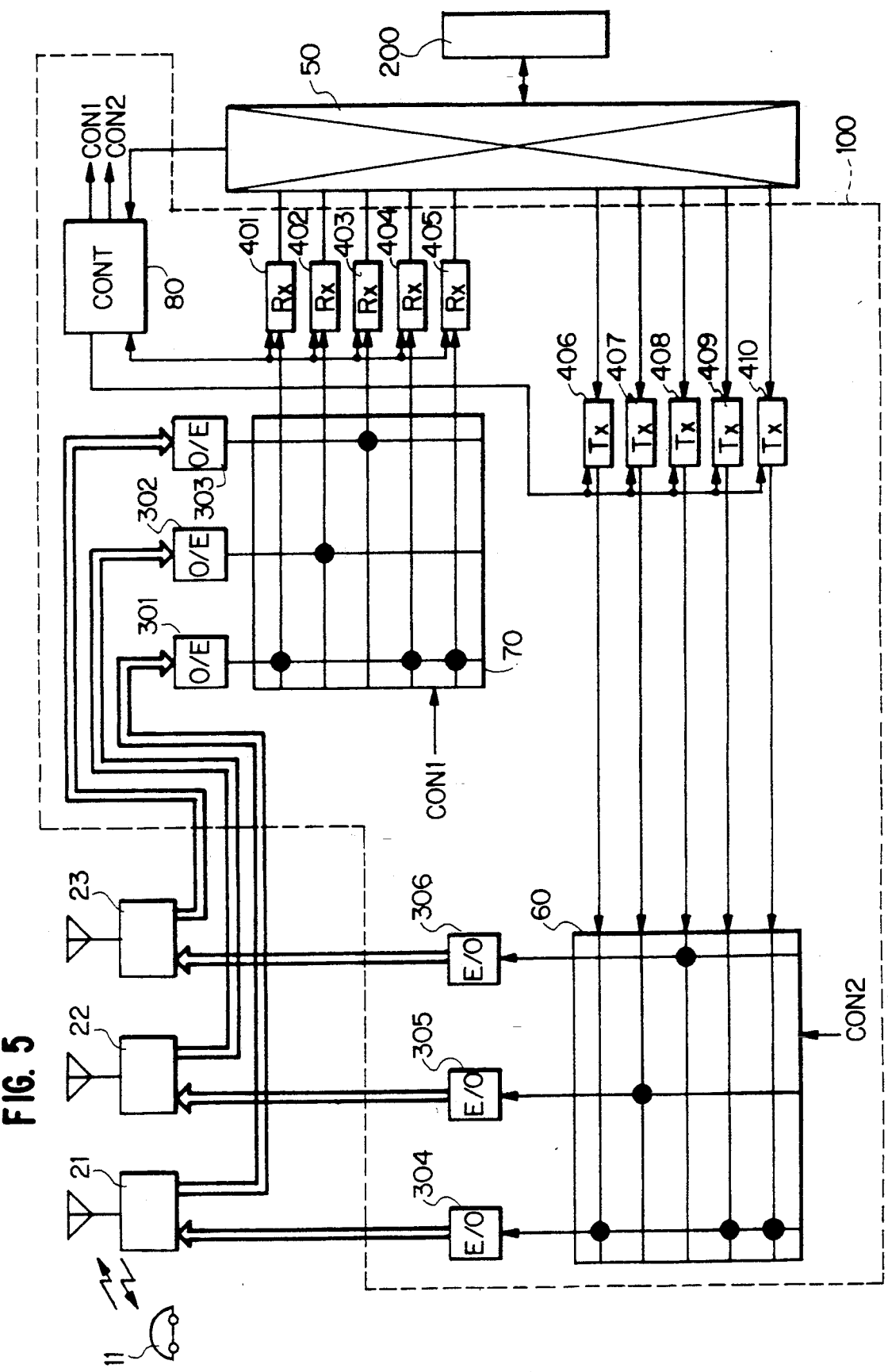

FIGS. 4 and 5 illustrate a fourth preferred embodiment of the present invention.

A first difference of this fourth embodiment from the first is the presence of a matrix switch 60 between five transmitters 406 to 410 and the three E/O converters 304 to 306. A second difference is that of another matrix switch 70 between the three O/E converters 301 to 303 and five receivers 401 to 405. It also differs from the first embodiment in that the control circuit 80 has the additional function of generating control signals for controlling the connections of the matrix switches 70 and 60.

The configuration and operation of the base radio stations 21 to 23 in this embodiment are the same as those in the first embodiment, and accordingly their description is dispensed with. Optical signals supplied from the base radio station 21 are reconverted into RF signals by the O/E converter 301. Optical signals entered from the base radio stations 22 and 23 are also entered into the input ports of the matrix switch 70 via the O/E converters 302 and 303, respectively. The output ports of the matrix switch 70 are connected to the receivers 401 to 405. The connecting state of the matrix switch 70 is controlled by the control circuit 80 with a control signal (CON1), and RF signals received by any base radio station are distributed to any one or more receiver or receivers. The receivers 401 to 405 can be tuned to any frequency under control by the control circuit 80, and control signals demodulated by the receivers 401 to 405 are sent out to the control circuit 80, while demodulated inbound speech signals are sent out to the mobile switching center 50.

Meanwhile, the transmitters 406 to 410 can be tuned to any frequency under control by the control circuit 80, and convert outbound speech signals sent out from the mobile switching center 50 and control signals sent out from the control circuit 80 into RF signals. The outputs of the transmitters 406 to 410 are supplied to the input ports of the matrix switch 60. The output ports of the matrix switch 60 are connected to the base radio stations 21 to 23 via the E/O converters 304 to 306, respectively. The matrix switch 60, whose connecting state is controlled by the control circuit 80 with a control signal (CON2), can synthesize high frequency signals modulated by any one or more transmitter or transmitters and send out the synthesized signals to any base radio station.

The connecting states of the matrix switches 60 and 70 shown in FIG. 4 indicate that the receiver 401 and the transmitter 406 are used for the transmission of control signals to and from the base radio station 21. Similarly the connecting states of the matrix switches 60 and 70 shown in this diagram indicate that the receiver 402 and the transmitter 407 are used for the transmission of control signals to and from the base radio station 22. The connecting states of the matrix switches 60 and 70 shown in FIG. 4 also indicate that the receiver 403 and the transmitter 408 are used for the transmission of control signals to and from the base radio station 23.

For the transmission and reception of speech signals to and from the mobile terminal 11 in the cell served by the base radio station 21 are used the receiver 404 and the transmitter 409. In this state, neither the receiver 405 nor the transmitter 410 is used.

If, in this state, a signal indicating the occurrence of a new call demand in the cell served by the base radio station 21 is given from the receiver 401 to the control circuit 80, the control circuit 80 will change the connecting states of the matrix switches 60 and 70 as illustrated in FIG. 5, and connects the receiver 405 and the transmitter 410 to the base radio station 21 to let the call begin.

Whereas all the base radio stations, receivers and transmitters in the mobile communication system are connected to a pair of matrix switches 60 and 70 in the above described embodiment, it is also practicable to let plural pairs of matrix switches accommodate the base radio stations, receivers and transmitters in a decentralized arrangement.

As hitherto described in detail, the present invention helps to simplify the configuration of base radio stations, and therefore makes it possible to realize compact enough base radio stations to be mounted on utility poles or the like.

Further according to the invention, the addition of an AGC circuit to each base radio station makes possible transmission over optical fibers at a sustained high C/N ratio even where the level of receive radio signals is low. Moreover, since this function enables the central base station to know the reception level at each base radio station, the central base station can control radio lines accurately.

The invention also enables any unused radio transceiver to be used by a base radio station with a high traffic density, and thereby makes it possible to provide, without sacrificing economy, a mobile communication system capable of flexibly accommodating traffic which is geographically uneven and moreover varies from time to time.

What is claimed is:

1. A cellular mobile communication system with M radio zones consisting of a plurality of mobile terminals, M base radio stations one of which is provided for each zone, a central base station connecting said base radio stations to a mobile switching center, and the mobile switching center connecting said central base station and a plurality of public lines, said base radio stations being connected by optical transmission paths to said central base station, wherein each of said M base radio stations comprises:

RF signal transceiver means for receiving RF band signals from said mobile terminals and in turn supplying said RF band signals as first RF signals, and for transmitting second RF signals to said mobile terminals;

first optical signal transmitting means, receiving said first RF signals, for converting said first RF signals into first optical signals and transmitting them to said central base station; and first optical signal receiving means for converting second optical signals from said central base station into said second RF signals, and said central base station comprises:

M second optical signal receiving means, one of which is provided for each of said M base radio stations, for receiving said second optical signals and converting them into third RF signals;

receiving means for demodulating said third RF signals and sending out a plurality of resultant first demodulated signals to said mobile switching center;

transmitting means for receiving signals from said public lines via said mobile switching center and converting the signals into fourth RF signals; and M second optical signal transmitting means, one of which is provided for each of said M base radio stations, for converting said fourth RF signals into said second optical signals, wherein each of said M base radio stations is further provided with gain control means, to which said first RF signals are supplied, for generating a gain control signal on the basis of the level of a received strength of said first RF signals, controlling the gain of said first RF signals on the basis of this gain control signal, and supplying the gain-controlled RF signals to said first optical signal transmitting means; and wherein each of said M base radio stations is further provided with multiplexing means for multiplexing said gain control signal and the gain-controlled RF signals, and supplying the resultant multiplexed signals to said first optical signal transmitting means, such that the received strength of said first RF signals is determined by said central base station.

* * * * *

UNITED STATES PATENT AND TRADEMARK OFFICE
CERTIFICATE OF CORRECTION

PATENT NO. : 5,400,391

DATED : March 21, 1995

INVENTOR(S) : Katsumi Emura et al.

It is certified that error appears in the above-identified patent and that said Letters Patent is hereby corrected as shown below:

Col. 5, line 28, delete "converts" and insert --converters--.

Signed and Sealed this

Third Day of October, 1995

Attest:

BRUCE LEHMAN

Attesting Officer

Commissioner of Patents and Trademarks